No. 873,660. PATENTED DEC. 10, 1907.
G. P. BLOW.
BATTERY CONNECTION.
APPLICATION FILED APR. 11, 1907.
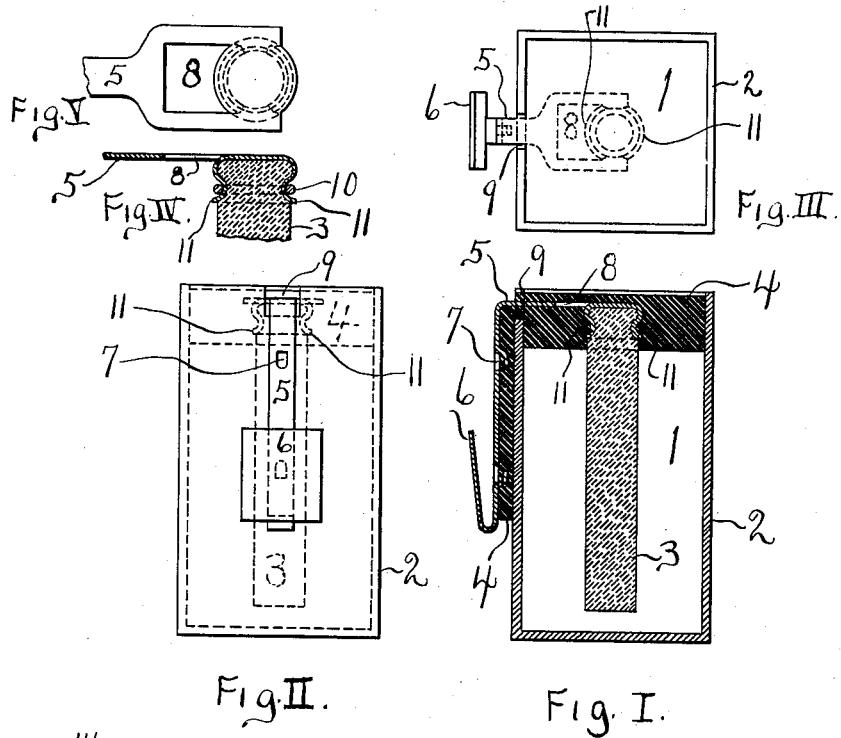
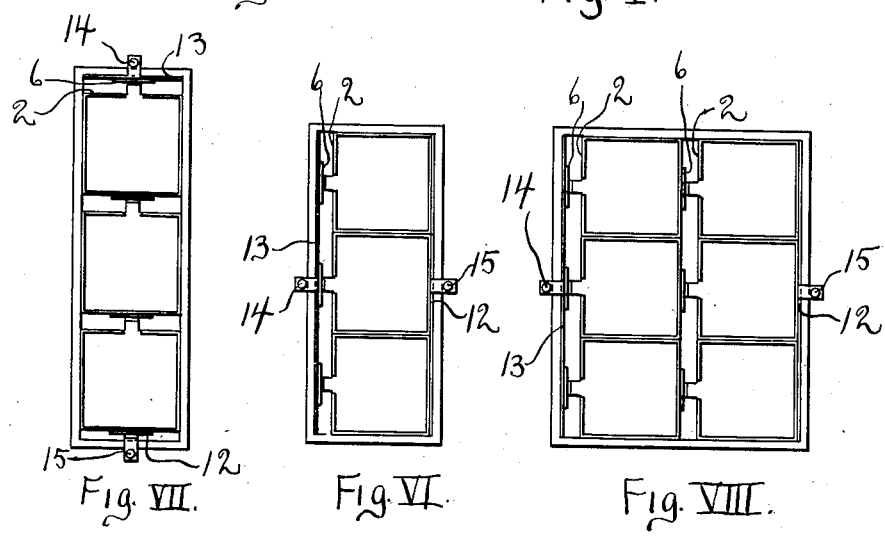
WITNESSES:
INVENTOR
George P. Blow.
BY
ATTORNEY

UNITED STATES PATENT OFFICE.

GEORGE P. BLOW, OF LA SALLE, ILLINOIS.

BATTERY CONNECTION.

No. 873,660.  Specification of Letters Patent.  Patented Dec. 10, 1907.

Application filed April 11, 1907. Serial No. 367,652.

*To all whom it may concern:*

Be it known that I, GEORGE P. BLOW, a citizen of the United States, residing at the city of La Salle, in the county of Lasalle and State of Illinois, have invented a certain new and useful Battery Connection, of which the following is a specification.

My invention relates to improvements in battery connections, particularly to that class of batteries known as dry batteries, and has for its object the production of a battery connection which does away with all connecting wires, screw connections and binding posts on the battery cell; the connecting together of the cells being accomplished simply by placing the cells together in a proper box or receptacle. And a further object of my invention consists in producing with the above mentioned connection the novel means of fastening the above mentioned connection to the carbon element of the battery. I attain these objects by means of the device shown in the accompanying drawings in which—

Figure 1 is a vertical cross-sectional view of my battery through the connection. Fig. 2 is a front view of my battery connection in position. Fig. 3 is a top view of my battery connection in position. Fig. 4 is an enlarged vertical cross-sectional view of a modification of the method of fastening my connection to the carbon element, showing additional means over that shown in Fig. 1. Fig. 5 is a top view of Fig. 4. Fig. 6 shows three cells having my device grouped so as to operate in parallel. Fig. 7 shows three cells with my connection operating in series. Fig. 8 shows six battery cells using my invention grouped so as to operate in series and in parallel at the same time.

In the drawings 2 represents the zinc container which generally forms the zinc element in dry batteries, and holds the exciting medium 1, the carbon element 3, and the content retaining, as well as insulating, material 4. The upper end of the carbon element 3 is formed with a ball-shaped head as shown, and the connection 5, which may be a strip of spring brass, has one end shaped so as to conform to the said head of carbon element 3, by cutting out the metal at 8 which with the end, is bent forming the lips 11 as shown. To fasten this connection to the carbon it is only necessary to force the lips 11 over the ball-shaped end of the carbon element, when it will grasp the same, inclosing it tightly, insuring a good contact which will be protected and maintained at all times by the insulating compound 4. Connection 5 further has a hook 7 cut out of its surface to hold the insulating material 4 between the metal strip 5 and the zinc element 2. The zinc element or container 2 is cut away at 9 to permit connection 5 to pass through it and be insulated from it.

Fig. 4 shows a modification of the method of fastening my connection to the carbon element shown in Fig. 1, which consists in the addition of twisting a wire 10 around the lips 11 so as to rigidly fasten the lips 11 against the carbon as shown.

The other end of the connection 5 is enlarged and bent upward, forming a resilient or spring member 6 which serves as the means for connecting my batteries together, as this is simply pressed or placed against another battery cell and then placing these cells in a proper box or receptacle, as shown in Figs. 6, 7 and 8, wherein 13 and 12 each represent a strip of metal with binding posts 14 and 15 for connection with the external system of wiring.

It is evident with my battery that it is a very simple matter when testing, to remove a dead cell and replace it with another. There are no binding screws to jar and come loose, no connecting wires to break, all of which, with the ease of replacing a cell even at night time, makes it particularly adapted for automobile service.

It is evident that I can use any conducting material for my connection and cells having any number of sides without departing from the spirit and purpose of my invention.

I claim;

1. In an electrical battery, a sheet metal connection fastened to the carbon element and insulated from the zinc element, having its end bent forming a resilient member.

2. In an electrical battery, a metal container, a carbon element with a ball-shaped end within said container, a sheet metal connection, insulated from said container, having resilient lips embracing the ball-shaped end of said carbon, and a resilient member forming a part of said connection external to said container.

3. In an electrical battery, a metal container, a notch from the side of said container, a carbon element with a ball-shaped end, a connection passing through said notch and insulated from said container, resilient lips on said connection for embracing the ball-shaped end of said carbon element and a resilient member on said connection external to said container.

GEORGE P. BLOW.

Witnesses:
  F. G. MOORE,
  WILLIAM A. RADTKE.